United States Patent Office 2,885,919
Patented May 12, 1959

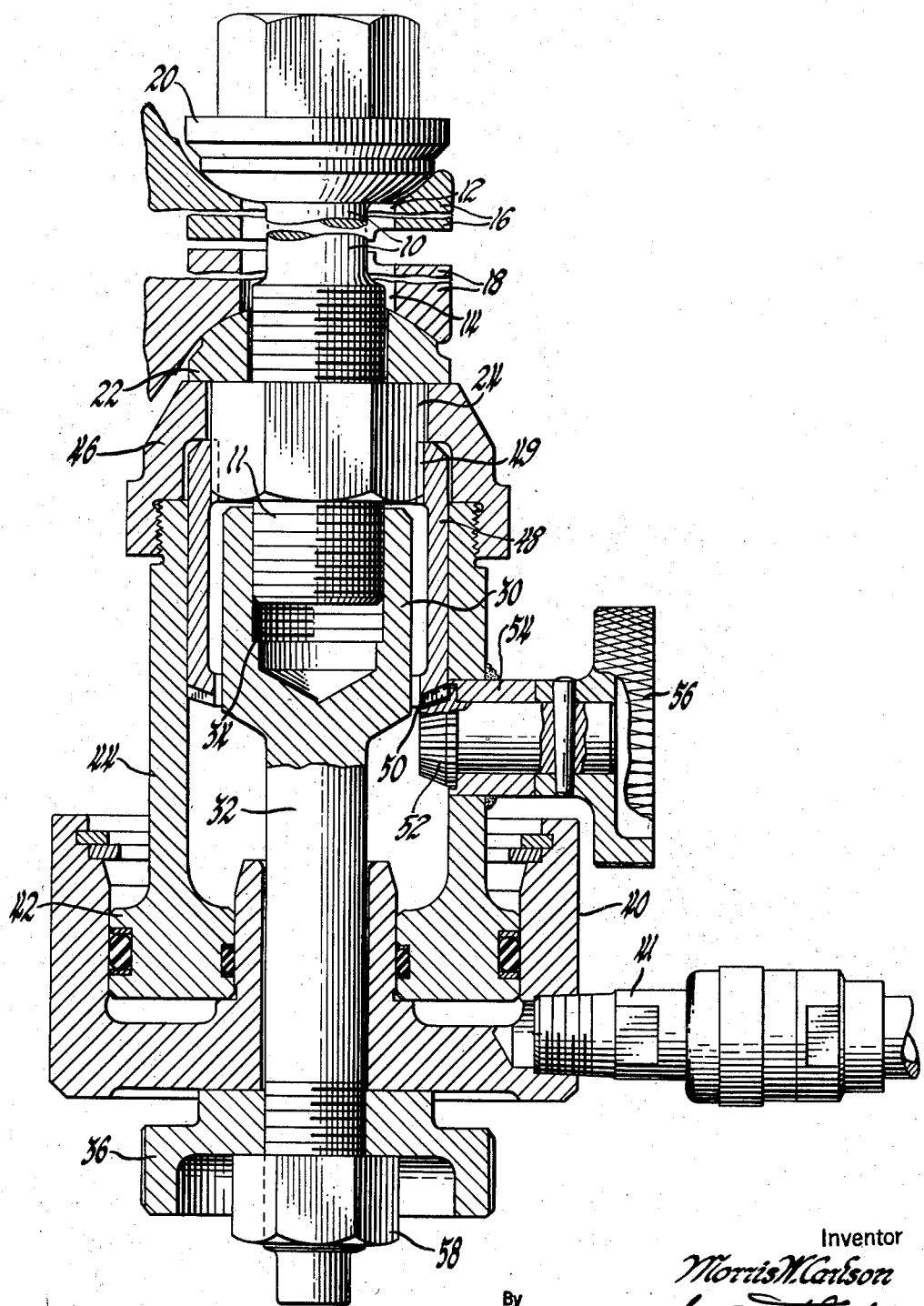

2,885,919
TOOL

Morris W. Carlson, Berea, Ohio, assignor to General Motors Corporation, Detroit, Mich., a corporation of Delaware Application July 8, 1954, Serial No. 442,068

4 Claims. (Cl. 81—56)

This invention relates to a tool for tightening bolts or studs and more particularly concerns a method and means for stressing bolts, studs and the like to a predetermined elongation and stress.

For a more thorough understanding of my invention, it will be noted that considerable difficulty has been encountered in the prior art in tightening nuts to exert an exact predetermined stress on the mating bolts, studs and the like. Efforts toward uniform tightening have been made by simply tightening a threaded nut on a threaded bolt or stud to a predetermined torque wrench reading. A refinement of this proposal provides a slip clutch within the torque wrench to provide for slipping and constant non-functioning of the wrench when the predetermined torque value has been reached. A somewhat similar technique in common use has been to turn down the nut on the bolt, stud or the like a predetermined number of threaded turns. Still another and more advanced technique used for more precise work has been to use a suitable gauge to determine the axial elongation of the bolt or stud; the tightening of the two threaded elements occurring up to the gauge setting in complete disregard of the torque reading or number of turns of the threading. With this procedure, fairly uniform tensioning has been attained.

The foregoing techniques can be carried into operation either manually or through the use of suitable automatic tools. However, it has been amply demonstrated that even in those instances where extreme care is employed in constructing the threaded members and where ample lubrication is employed during the tightening process, the above described techniques may still permit tensioning differences to occur. Such tensioning differences are primarily due to friction developed at the clamping and threaded surfaces during the tightening process. Where torque wrenches are utilized, these variations in the frictional forces will necessarily result in torque readings which are not uniformly indicative of the degree of tightness attained. Where the degree of tightness is determined by the elongation of the bolt as indicated by gauges or by the number of turns of threading, these frictional forces will impart torsional effects to the bolt which permit a certain relative looseness to develop subsequent to assembly. This tendency to loosen is accentuated by vibrations or impacts occurring on or through the assembled apparatus. Where bolt elongation is utilized as the determinative factor, variations in these frictional forces will also result in indeterminable torsional stressing components which when resolved with the axially stressing components within the bolts may result in early fatigue bolt failures or even before the prescribed stressing or elongation has been accomplished during the nut-tightening process.

An object of this invention is to provide a method for uniformly stressing bolts, studs or the like without a relatively high percentage of failures during and subsequent to the assembly operation such as are companion to conventional stud or bolt tightening methods for the reasons given above and which may be used to tighten threadless nuts and bolts as well; more specifically this method includes the steps of first stressing the stud or bolt axially to predetermined values of elongation and axial stress prior to tightening or torquing down the mating nut. Because the applied tension force can be more closely controlled and bolt twist eliminated, the allowable working stress of the bolt can be increased. The consequent increase in elongation results in a fastening that is far more elastic and self-locking than can be obtained by the torquing method.

The invention has particular application to internal combustion engines and the like in which the individual cylinders are secured to the engine crankcase by means of a split two-piece clamping ring; the cylinder projecting from the crankcase having an integral flange which is held tightly against a duplicate flange on the crankcase by the diametrically split clamping ring. Such a construction is disclosed in United States Patent 2,674,988. In such applications, manufacturing tolerances, variations in temperature and rates of thermal expansion, and wear in service make it impossible to bolt the two clamping ring halves solidly together. A nominal gap is therefore provided between the clamp halves. In order to prevent clamping ring looseness from developing these conditions require a higher degree of flexibility, elasticity and stress control in the means of fastening the two ring halves together than possible with conventional bolt-torque or bolt-elongation stress measuring methods. While the method and means of this invention permit the desired flexibility and control of high axial bolt stresses required for such clamping rings their use is not limited to applications of this particular type and are considered to be applicable to nut-and-bolt fastenings generally.

Another object of my invention is the provision of a bolt or stud tightener capable of accomplishing the heretofore described method which, while simple, sturdy, fool-proof, compact and self-contained, achieves the tightening of such bolts, studs or the like to predetermined elongations and stress not possible by conventional means and without subjecting the bolt to twist and without subjecting the clamping or threaded surfaces of the nut and bolt to undue friction during tightening of the nut. This object is attained by providing a tool which includes an adaptor which is adapted to engage the end of the bolt beyond the nut. The adaptor carries a power-operated mechanism which is selectively energizable to react between the opposite end of the bolt or stud through the bolted members to exert a predetermined elongation and stress on the bolt. A socket wrench provided in the tool is then utilized to advance the nut on the elongated bolt to take up the slack occurring therein and to bring the nut into snug relation with the adjacent bolted part.

A further object of this invention is to provide a stressed nut-and-bolt coupling for a plurality of members to be secured together in which a comparatively high axial component of stress is maintained in the bolt by the nut threaded thereon. More specifically it is contemplated to provide such a coupling in which the axial stress is substantially the sole component of stress maintained in the bolt.

These and other objects of the invention will be more thoroughly understood from the following detailed description in which reference is made to the accompanying drawing, in which a tool embodying my invention with portions is shown broken away and in section.

Referring more particularly to the drawing, a through bolt having a necked-down shank portion 10 and a threaded end portion 11 is shown extended through two axially aligned bores 12 and 14 provided in members 16 and 18, which represent two clamp ring halves and are to be clamped together by the bolt and a nut 24 threadably embracing the threaded end portion 11 of the bolt. Washer members 20 and 22 are interposed between the head of the bolt and the member 16, and between the nut 24 and the member 18, respectively.

The illustrated embodiment of the bolt-stressing and nut-tightening tool of my invention includes a bolt prestressing means comprising an adaptor member 30 provided with a threaded bore 34 at one end for engaging the threaded end 11 of the bolt and with a handwheel 36 secured to the opposite end thereof for turning the adaptor down on the bolt. An intermediate shank portion 32 of the adaptor is slidably and rotatably embraced by an annular cylinder 40 which is connectible to a controllable source of pressure fluid, not shown, by a conduit 41. An annular piston member 42 is reciprocably mounted within the cylinder and forms an expansible chamber therewith. The piston 42 is provided with a sleeve portion 44 and a collar member 46 threaded thereon which serves to transmit the reaction of the piston to the head of the bolt through the clamped members when fluid pressure is supplied to the pressure cylinder 40 while the cylinder acts on the threaded end of the bolt 32 through the adaptor 30 and its handwheel 36 to effect a predetermined axially elongating stress on the bolt in accordance with the pressure of the actuating fluid supplied by the controllable source.

The tool shown also includes a wrench means comprising a single member 48 rotatably mounted within the sleeve portion of the piston and retained therein by the collar 46. The member 48 is provided with a suitable wrench socket 49 at one end for embracing the nut 24 and a bevel gear 50 at its opposite end. The gear 50 meshes with and is driven by a bevel gear pinion 52 journalled in and projecting laterally from the side of the piston member 42 as shown at 54. The gear 52 may be rotated either by a manually operable knob 56, as shown, or by a suitable limited-torque power device, not shown.

The tool illustrated may be utilized for threaded members of different assorted sizes by provision for interchangeable adaptor member 30 and wrench socket member 49. The adaptor member 30 is axially removable from the tool by removing the nut 58 and radial or axial pins, not shown, non-rotatably securing the handwheel 36 on the external end of the adaptor. The wrench member 48 is removable from the tool by first removing the retaining collar 46. It will be apparent that the adaptor and socket member can be replaced with similar members of the desired size by similar reverse procedures.

My invention contemplates the tightening of nut-and-bolt members by a method which basically comprises the steps of first elongating the bolt member with a predetermined axial loading or stress, and secondly advancing the nut member upon the elongated bolt into snug relationship with the adjacent one of a plurality of bolted-together members to maintain the predetermined elongating stress within the bolt. However, other secondary steps will become apparent from the detailed discussion below of the operation and use of the afore-described nut-and-bolt tightening tool embodying my invention.

The bolt nut may be advanced upon the bolt by either conventional means before using the tool of this invention for tightening purposes or by the socket wrench provided in the tool. If the tool is to be used as an assembly wrench, the nut will be placed within the socket 49 before turning on the bolt. If the nut is already threaded on the bolt, the side knob 56 is used to help slip the socket upon the nut. In either case, once the nut has been initially turned down on the bolt, the adaptor is pushed into engagement with the bolt and is then threadedly advanced upon the bolt until it engages the threaded bolt end to a proper depth. To insure that the adaptor has engaged the bolt end to a proper depth before the cylinder is energized to elongate the bolt, the handwheel 36 is positioned on the adaptor 30 so that all the play will be taken out of the de-energized tool when the properly engaged adaptor draws the handwheel into abutment with the top of the cylinder 40. The expansible chamber formed by the cylinder 40 and the piston 42 is then connected to the controlled fluid pressure source through the fluid pressure line 41 to produce a predetermined hydraulic load axially stressing and elongating the bolt. After tapping the clamped members to eliminate friction therebetween the wrench member 48 is then rotatably driven by the gears 50 and 52 to advance the nut toward the head end of the bolt and into snug relation with the washer 22 without the application of torsional stress components to the bolt. In this manner the looseness resulting from elongation of the bolt is removed and the nut in its advanced position maintains the predetermined axially elongating stress upon the bolt when the fluid pressure is relieved and the stressing tool is removed.

It should be noted that the bolt or stud tightener of my invention can be utilized both as an assembly and tightening wrench and that it is not necessary to the practice of my invention that the stressing of the bolt members be accomplished during assembly. It will be appreciated that there are numerous articles of manufacture, such as engines or the like in which it would be advantageous to precision tighten all of the bolts only after final assembly.

While the foregoing description and figure have been confined to one specified embodiment of a tool for accomplishing the method of the invention, it will be apparent to those skilled in the art that numerous modifications can be made therein without departing from the spirit and scope of the inventive concepts thereof. Accordingly, it is to be understood that the foregoing are to be interpreted as illustrative only and not in a limiting sense, reference being had to the appended claims to determine the scope of the invention.

I claim:

1. A device for applying a predetermined tensile stress axially of a bolt prior to tightening a nut thereon comprising a cylinder member having a piston member reciprocably mounted therein and forming an expansible chamber therebetween, a controllable source of fluid pressure connected to said expansible chamber, a first means carried by one of said members and operable to engage one end of said bolt above the nut initially placed thereon and a second means carried by the other of said members and operable to react against the opposite end of said bolt, said first and second means rendering said members operable upon application of a predetermined fluid pressure to said chamber to apply said predetermined tensile stress axially of said bolt thereby effecting elongation thereof, and a wrench socket mounted within one of said members and driven by a gear means mounted on said one of said members and adapted to embrace and advance said nut into snug relationship with an adjacent member to thereby maintain the stressed elongation of said bolt after the fluid pressure is released from said chamber.

2. In a device for applying a predetermined tensile stress axially of a bolt prior to tightening a nut thereon, the combination comprising a cylinder member, a piston member reciprocably mounted therein and forming an expansible chamber therebetween, a controllable source of fluid pressure connected to said expansible chamber, a first means carried by one of said members and adapted to threadably engage one end of said bolt above the nut initially threaded thereon, a second means carried by the other of said members and including a sleeve portion spacedly embracing said nut and said bolt end and operable to react against the opposite end of said bolt, said first and second means rendering said members operable upon application of a predetermined fluid pressure to said chamber to apply said predetermined tensile stress axially of said bolt thereby effecting elongation thereof, and a wrench socket journaled within said sleeve portion and adapted to engage said nut, said wrench socket being geared to a driving means including a driving gear, said driving means being operable to drive said wrench socket to advance said nut into snug relationship with an adjacent member to thereby maintain the stressed elongation of said bolt after the fluid pressure is released from said chamber.

3. A device for applying a tensile load to a bolt to thereby axially stress and effect the elongation thereof and for subsequently advancing a nut initially threaded thereon, said device comprising, a combination, a cylinder having concentrically spaced inner and outer sleeve portions interconnected at one end thereof by a radially extending said portion, an annular piston member reciprocably mounted with respect to said cylinder sleeve portions and coacting with said cylinder portions to form an expansible chamber therebetween, a controllable source of fluid pressure connected to said expansible chamber, an adapter member telescopically embraced and carried by said inner sleeve cylinder portion, said adapter member being adapted to threadably engage one end of said bolt above the nut threaded thereon, said piston member having a sleeve portion concentrically and spacedly embracing said adapter, said nut and said bolt end, said piston sleeve portion being operable to react against the opposite end of said bolt and in cooperation with said adapted member rendering said piston and cylinder members operable upon application of fluid pressure to said chamber to apply tensile load to said bolt thereby effecting the stressed elongation thereof, a wrench socket rotatably mounted within said piston sleeve portion and adapted to drivingly engage said nut, and gear means rotatably mounted with respect to said piston sleeve portion and adapted to rotate said socket to threadably advance said nut with respect to said bolt.

4. In a device for applying a tensile load to a bolt thereby axially stressing and effecting the elongation thereof and for subsequently advancing a nut initially threaded thereon, the combination comprising a cylinder closed at one end and having a piston reciprocably mounted therein to form an expansible chamber therewith, a controllable source of fluid pressure connected to said expansible chamber, an adapter member concentrically carried by said cylinder and adapted to threadably engage one end of said bolt above said nut, said piston member having a sleeve portion in spaced concentric relation to said adapter, nut and bolt end and operable to react against the opposite end of said bolt thereby cooperating with said adapter member to render said piston and cylinder operable upon application of fluid pressure to said chamber to apply said tensile load to said bolt thereby effecting the elongation thereof, and wrench means carried by said piston for threadably advancing said nut with respect to said bolt, said wrench means including a wrench socket rotatably mounted within said piston sleeve portion and adapted to drivingly engage said nut, said wrench socket having a gear thereon, and a driving gear rotatably mounted with respect to said piston sleeve portion and adapted to drivingly rotate said socket to threadably advance said nut with respect to said bolt.

References Cited in the file of this patent
UNITED STATES PATENTS

| | | |
|---|---|---|
| 1,389,154 | Newhouse | Aug. 30, 1921 |
| 1,824,033 | Brenneman | Sept. 22, 1931 |
| 1,869,687 | Hart | Aug. 2, 1932 |
| 2,504,393 | Cook | Apr. 18, 1950 |
| 2,571,265 | Leufven | Oct. 16, 1951 |
| 2,684,524 | Beck | July 27, 1954 |
| 2,728,978 | Birkenmaier | Jan. 3, 1956 |
| 2,730,797 | Lipski | Jan. 17, 1956 |

UNITED STATES PATENT OFFICE
CERTIFICATE OF CORRECTION

Patent No. 2,885,919                                      May 12, 1959

Morris W. Carlson

It is hereby certified that error appears in the printed specification of the above numbered patent requiring correction and that the said Letters Patent should read as corrected below.

Column 4, line 34, for "specified" read -- specific --; column 5, line 21, for "said" read -- head --.

Signed and sealed this 22nd day of September 1959.

(SEAL)
Attest:

KARL H. AXLINE
Attesting Officer

ROBERT C. WATSON
Commissioner of Patents